US007520684B2

(12) United States Patent
Ingalls et al.

(10) Patent No.: US 7,520,684 B2
(45) Date of Patent: Apr. 21, 2009

(54) CAMERA MOUNT

(75) Inventors: David R. Ingalls, Corvallis, OR (US); Marvin L. Casperson, Corvallis, OR (US); Scott D. Grasley, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 11/352,861

(22) Filed: Feb. 13, 2006

(65) Prior Publication Data

US 2007/0189764 A1 Aug. 16, 2007

(51) Int. Cl.
*G03B 17/00* (2006.01)

(52) U.S. Cl. ...................... 396/419; 396/427; 396/428; 348/373

(58) Field of Classification Search ..................... 396/5, 396/419, 427, 428; 348/373
See application file for complete search history.

(56) References Cited

U.S. PATENT DOCUMENTS

| | | | | |
|---|---|---|---|---|
| 3,868,706 | A | 2/1975 | Steingold | |
| 4,160,999 | A * | 7/1979 | Claggett | 348/151 |
| 4,190,866 | A | 2/1980 | Luknar | |
| 4,699,484 | A * | 10/1987 | Howell et al. | 352/243 |
| 5,032,856 | A | 7/1991 | McMinn | |
| 5,181,120 | A * | 1/1993 | Hickey et al. | 348/373 |
| 5,627,616 | A * | 5/1997 | Sergeant et al. | 396/427 |
| 6,721,501 | B2 * | 4/2004 | Komatsu | 396/429 |
| 7,101,095 | B2 * | 9/2006 | Kajino et al. | 396/427 |
| 2008/0068462 | A1 * | 3/2008 | Koumura | 348/148 |

* cited by examiner

*Primary Examiner*—W. B. Perkey
*Assistant Examiner*—Michael A Strieb

(57) ABSTRACT

Various embodiments and methods relating to a camera mount are disclosed.

23 Claims, 7 Drawing Sheets

CAMERA MOUNT

BACKGROUND

Camera observation systems are sometimes used to observe activities in room or other area. In many circumstances, movement of the camera to observe different portions of the room or area is distracting to those in the room or other area. In addition, the relatively large size of the opening through which observation occurs may undesirably permit noise to be transmitted to the room or area being observed.

DETAILED DESCRIPTION OF EXAMPLE EMBODIMENTS

Figure 1:
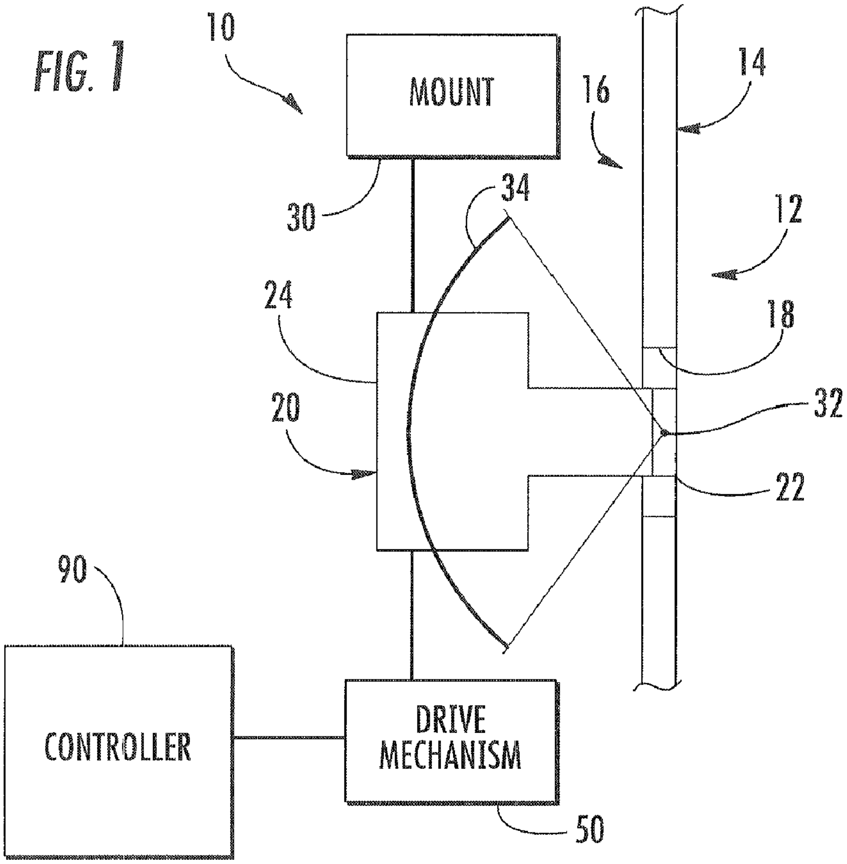
FIG. 1 is a sectional view schematically illustrating one example of a camera observation system according to one example embodiment.
Figure 2:
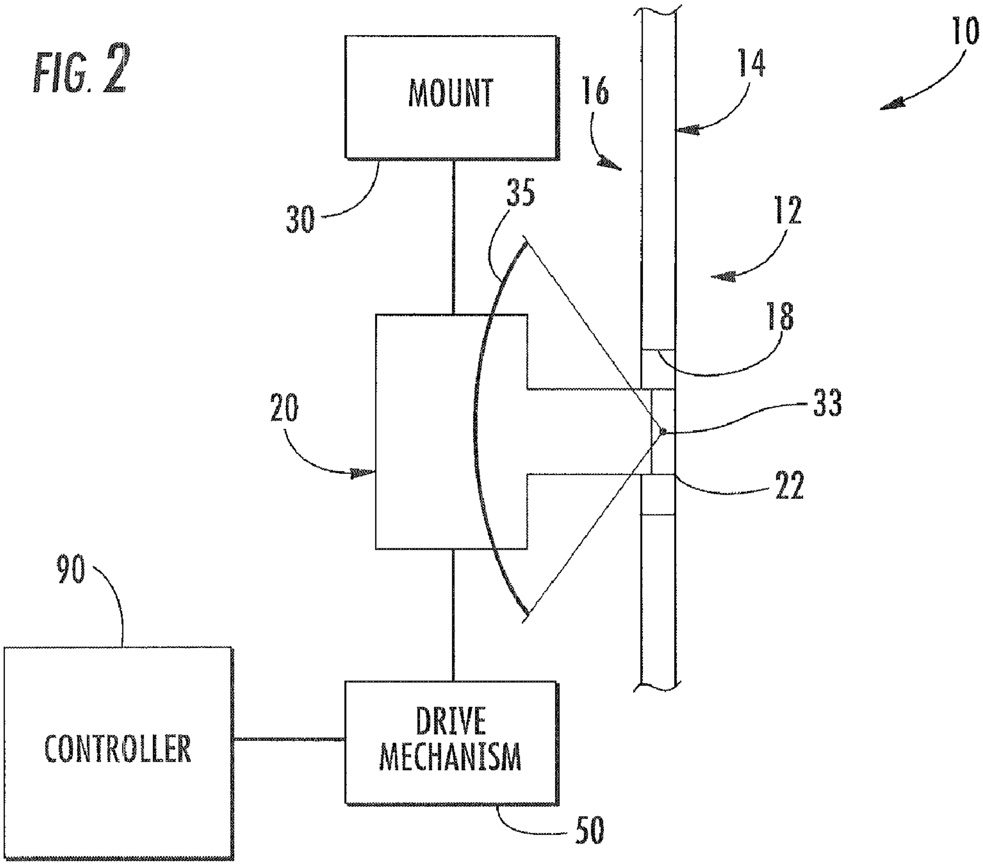
FIG. 2 is a sectional view schematically illustrating the camera observation system of FIG. 1 according to an example embodiment.

FIGS. 1 and 2 schematically illustrate one example of a camera observation system 10 according to one example embodiment. Camera observation system 10 facilitates viewing or monitoring of an area on a first side 12 of a structure 14 using equipment or components located substantially on a second opposite side 16 of structure 14. Such viewing occurs through an opening 18 within structure 14. In the particular example illustrated, structure 14 comprises a substantially vertical or inclined wall, wherein opening 18 extends in a substantially vertical or inclined plane. In other embodiments, structure 14 may be formed by other surfaces. For example, in other embodiments, structure 14 may alternatively comprise a ceiling or floor. In such embodiments, the ceiling or floor may have an opening 18 that extends in a substantially horizontal plane. In particular embodiments, such viewing through opening 18 may be used for surveillance of activities on side 12 of structure 14, may be used to record activities on side 12 of structure 14, may be used to photograph objects on side 12 of structure 14 or may be used for video conferencing.

As will be described in greater detail hereafter, camera observation system 10 provides an increased viewing range without substantially increasing the size of opening 18. By maintaining the relatively small size of opening 18, the amount of noise that would otherwise be transmitted through opening 18 to the area being observed is reduced. Moreover, by maintaining or reducing the size of opening 18, the likelihood that movement of a camera or other objects on the second side 16 of structure 14 is less likely to distract persons on the first side 12 of structure 14. Consequently, observation is enhanced.

Camera observation system 10 generally includes camera 20, mount 30, drive mechanisms 50 and controller 90. Camera 20 comprises a device configured to receive and capture light reflected off of surfaces or objects on side 12 of structure 14. In one embodiment, camera 20 may be configured to transmit the captured light which forms images for monitoring of activities on side 12 of opening 18. In yet other embodiments, camera 20 may additionally or alternatively be configured to record the captured light or image as video onto a memory medium such as a tape, disk or other digital memory. In still other embodiments, camera 20 may be configured to take snapshots or pictures of objects or activities on side 12 of opening 18. Camera 20 generally includes a front lens 22 and an image processing or capturing portion 24. Lens 22 comprises one or more lenses configured to treat and/or focus light received from side 12 of structure 14. As shown by FIGS. 1 and 2, lens 22 is positioned proximate to opening 18 of structure 14. In the example illustrated, lens 22 is positioned within opening 18 of structure 14. In other embodiments, lens 22 may pivot through opening 18 beyond side 12 of structure 14 or may be recessed behind opening 18 on side 16 of structure 14. In one embodiment, each of the circumferential or other perimeter side edges of lens 22 are spaced from the inner sides or edges of wall opening 18 by less than or equal to about 16% of the lens diameter for a lens rotating through a range of 60 degrees, nominally at least +–30 degrees, pointed through opening 18.

Image processing or capturing portion 24 comprises that portion of camera 20 configured to convert captured light into digital signals that may be transmitted and/or recorded or to use such captured light to chemically alter an analog medium for recording video images or still images. In lieu of capturing and transmitting or recording visible light, camera 20 may alternatively be configured to capture, sense, transmit or record other forms of electromagnetic radiation such as ultraviolet light or infrared light.

Mount 30 comprises one or more structures operably coupled to camera 20 and configured to movably support camera 20 with respect to structure 14 and its opening 18. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Mount 30 is configured to support portion 24 of camera 20 on a side 16 of structure 14 such that camera 20 is substantially concealed or hidden from side 12. Because portion 24 is offset from structure 14, a pivoting range of lens 22 is enlarged. According to one embodiment, portion 24 is offset or spaced from structure 14 by at least about 75 mm. In other embodiments, this distance may be reduced. Mount 30 further pivotally supports lens 22 about axis 32 (shown in FIG. 1) and axis 33 (shown in FIG. 2) such that the optics of camera 20, lens 22, is not substantially occluded during movement of lens 22. In the illustrated example, mount 30 is configured to movably support camera 20 such that a remainder of camera 20, such as image processing portion 24, moves along arc 34 (shown in FIG. 1) and arc 35 (shown in FIG. 2) which are each offset or spaced from structure 14 and have a radius of at least about 150 mm. In the particular example illustrated, axis 32 is a substantially vertical axis such that movement of camera 20 along arc 34 results in lens 22 being panned in a leftward or rightward direction. Axis 32 is proximate to structure 14. According to one embodiment, axis 32 is spaced from either side 12 of structure 14 or side 16 of structure 14 by a distance of less than or equal to about 0.25 inches (0.64 cm). In the particular example illustrated in which structure 14 has a thickness, axis 32 extends within the thickness of structure 14. In one particular embodiment, axis 32 is substantially centered within the thickness of structure 14, enhancing observation range while permitting opening 18 to remain relatively small. In other embodiments, axis 32 may be forward of side 12 or rearward of side 16. Because axis 32 about which lens 22 pivots is proximate to structure 14, lens 22 may be pivoted by relatively large degrees for a large viewing range while a size of opening 18 remains relatively small. For example, camera 20 may provide a full field of view of side 12 of structure 14 with opening 18 being sized slightly larger than a diameter of lens 22. As a result, larger high quality lenses may be employed without relatively large and potentially unattractive openings in structure 14.

Axis 33 is a substantially horizontal axis such that movement of a remainder of camera 20 along arc 35 results in lens 22 being tilted upward or downward. Like axis 32, axis 33 is proximate to opening 18 of structure 14. Axis 33 is spaced from either side 12 of structure 14 or side 16 of structure 14 by a distance less than or equal to about 0.25 inches (0.64 cm). In the particular example illustrated in which structure 14 has a thickness, axis 33 is located within the thickness of structure 14. According to one embodiment, axis 33 is spaced from either side 12 of structure 14 or side 16 of structure 14 by a distance of less than or equal to about 0.25 inches (0.64 cm). In the particular example illustrated in which structure 14 has a thickness, axis 33 extends within the thickness of structure 14. In one particular embodiment, axis 33 is substantially centered within the thickness of structure 14, enhancing observation range while permitting opening 18 to remain relatively small. Because axis 33 about which the remainder of camera 20 pivots is proximate to structure 14, lens 22 of camera 20 may be pivoted to tilt across a large viewing range without having to use a large opening 18. As a result, larger, higher quality lenses may be employed without an unattractive large opening 18 in structure 14.

According to one example embodiment, mount 30 pivotally supports camera 20 and lens 22 about axis 32 such that camera 20 moves along arc 34 having a radius of at least about 150 millimeters and less than or equal to about 300 millimeters. In one embodiment, arc 34 is centered at axis 32. In one embodiment, mount 30 movably supports camera 20 such that camera 20 moves along arc 35 having a radius of at least about 150 millimeters and a radius of less than or equal to about 300 millimeters. In one embodiment, arc 35 is also centered at axis 33. Although mount 30 is illustrated as pivotally supporting camera 20 for pivoting of lens 22 about both axes 32 and 33 to provide relatively large tilting and panning ranges, in other embodiments, mount 30 may alternatively be configured to pivotally support lens 22 about a single axis 32 or a single axis 33.

In one embodiment, mount 30 is mounted to a ceiling. In yet other embodiments, mount 30 may be mounted to the floor or a side wall proximate to structure 14. In one embodiment, mount 30 may be directly connected to camera 20 proximate to lens 22. In such an embodiment, mount 30 itself may be connected to structure 14 adjacent opening 18. In yet other embodiments, mount 30 may be directly connected to image processing portion 24 of camera 20 generally distant lens 22 and opening 18.

Drive mechanism 50 comprises a mechanism operably coupled to camera 20 and configured to pivot camera 20 about axes 32 and 33 along one or both of arcs 34 and 35. In one embodiment, drive mechanism 50 may comprise a first drive mechanism dedicated to moving camera 20 along arc 34 and a second drive mechanism configured to move camera 20 along arc 35. In one embodiment, drive mechanism 50 may include an actuator, such as a motor, operably coupled to camera 20 by one or more drive trains which may be gear trains, chain and sprocket arrangements or belt and pulley arrangements and the like.

Controller 90 comprises a processing unit configured to generate control signals for directing operation of drive mechanism 50. For purposes of this disclosure, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 90 is not limited to any specific combination of hardware circuitry and software, nor to any particular source for the instructions executed by the processing unit.

In operation, controller 90 generates control signals directing drive mechanism 50 to drive camera 20 along arc 34 to a desired pan angle. Controller 90 further generates control signals directing drive mechanism 50 to drive camera 20 along arc 35 to a desired tilt angle. As noted above, because camera 20 and its lens 22 pivot about an axis proximate to opening 18 of structure 14, camera 20 may be provided with a large viewing range without opening 18 having a relatively much larger diameter as compared to a diameter of lens 22. In one particular embodiment, the inner edges of opening 18 are spaced from the outer edges of lens 22 by opposite gaps wherein each gap is a width less than or equal to about 16% of the overall diameter of lens 22 for a lens 22 configured to rotate at least +−30 degree through opening 18.

Figure 3:
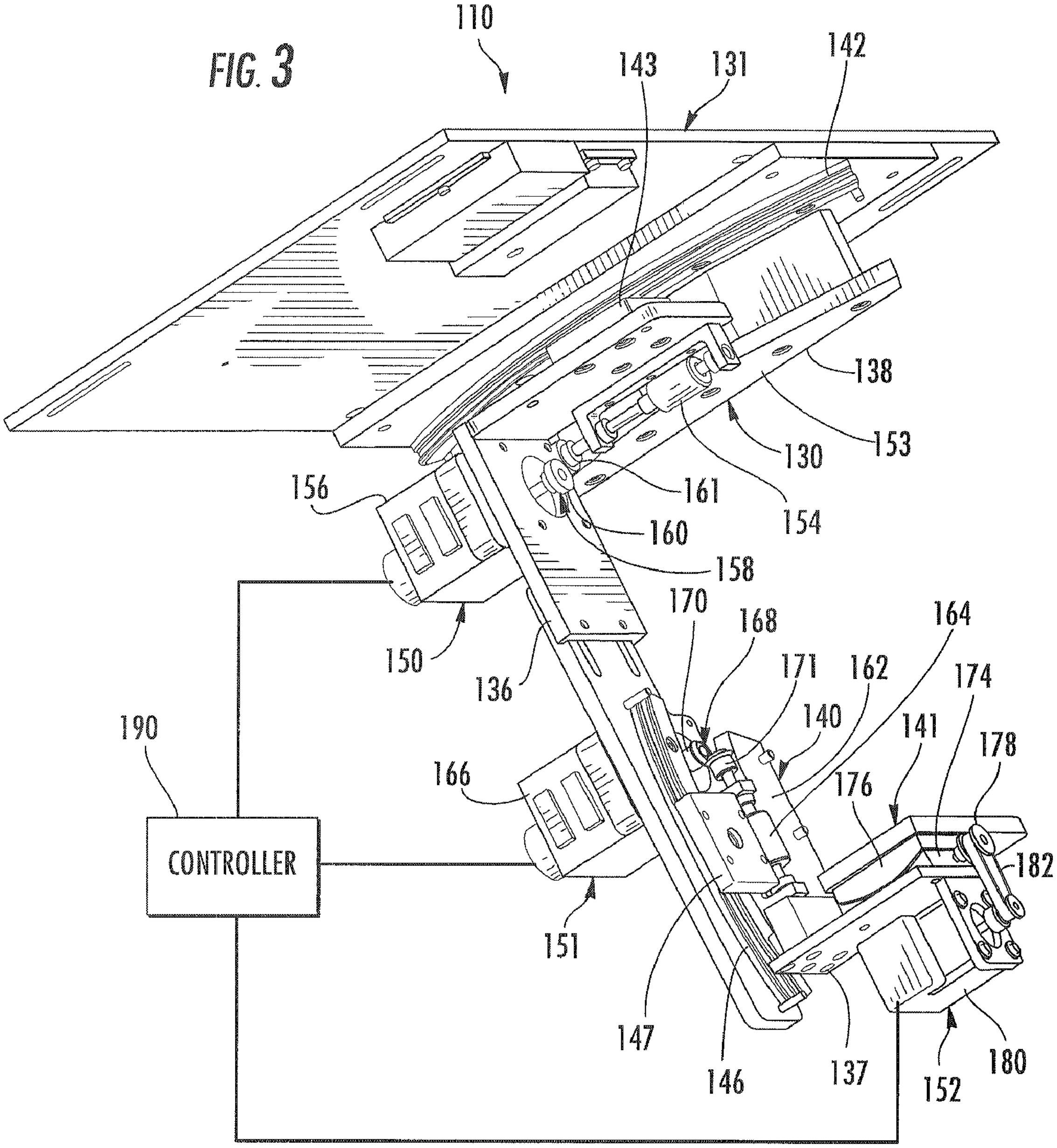
FIG. 3 is a top perspective view of another embodiment of the camera observation system of FIGS. 1 and 2 according to an example embodiment with a camera omitted for purposes of illustration.
Figure 6:
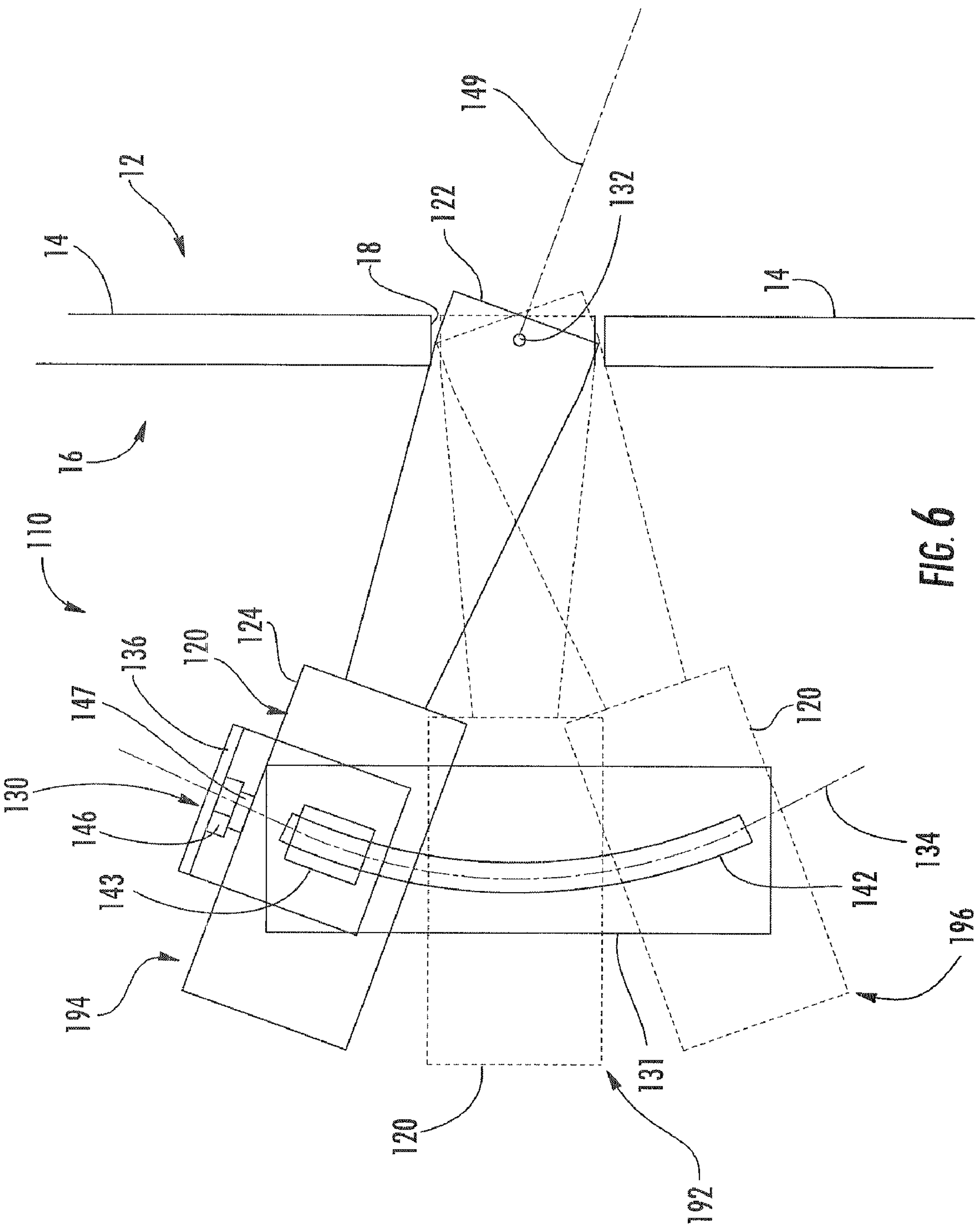
FIG. 6 is a schematic illustration of the camera observation system of FIG. 3 illustrating panning of a camera according to an example embodiment.
Figure 7:
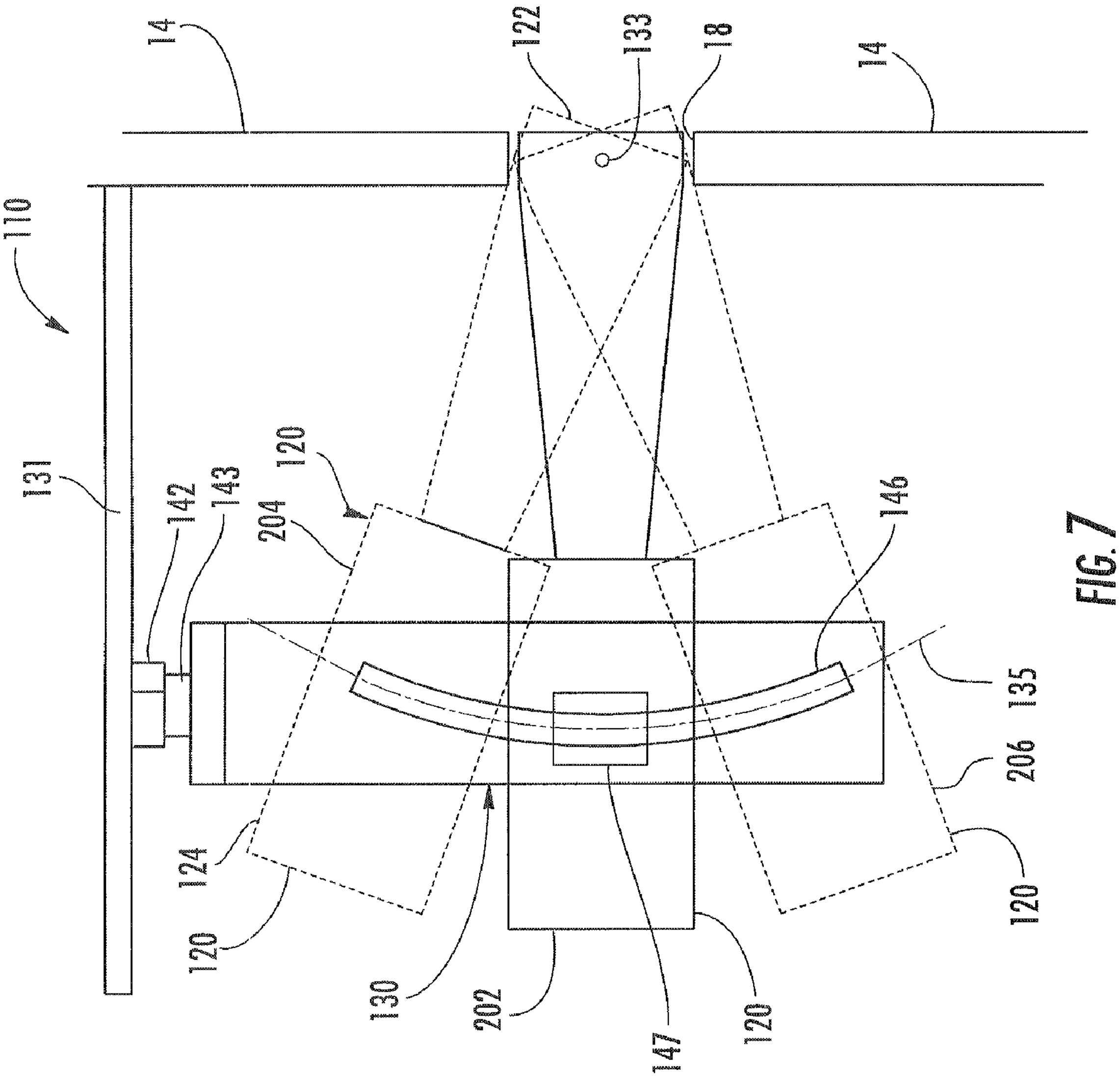
FIG. 7 is a schematic illustration of the camera observation system of FIG. 3 illustrating tilting of the camera according to an example embodiment.

FIGS. 3, 6 and 7 illustrate camera observation system 110, one specific embodiment of camera observation system 10 shown in FIGS. 1 and 2. Like system 10, system 110 provides an enlarged viewing range without a correspondingly large wall opening. Observation system 110 generally includes camera 120 (shown in FIGS. 6 and 7), mount 130, drive mechanisms 150, 151, 152 and controller 190 (schematically shown). As shown in FIGS. 6 and 7, camera 120 includes lens 122 and rearward imaging processing portion 124. Lens 122 and image processing portion 124 are substantially similar to lens 22 and image processing portion 24 shown and described with respect to FIGS. 1 and 2. In other embodiments, camera 120 may have other configurations.

Mount 130 comprises one or more structures configured to pivotally support lens 122 for pivotal movement about axis 132 (shown in FIG. 6) and axis 133 (shown in FIG. 7) by movably supporting camera 120 along arc 134 (shown in FIG. 6) and arc 135 (shown in FIG. 7). Mount 130 generally includes base 131, camera supports 136, 137, panning system 138, tilting system 140 and roll system 141. Base 131 comprises one or more structures which serve as a platform, substrate or foundation for the remaining components of mount 130. In the particular example illustrated, base 131 comprises a plate assembly to which panning system 138 is mounted. Base 131 is configured to facilitate connection of mount 130 to a support structure such as a ceiling. In other embodiments, base 131 may be configured to connect the remaining components of mount 130 to other structures or may be omitted where panning system 138 is directly mounted to a support structure such as a ceiling.

Camera support 136 comprises one or more structures supporting camera 120 and extending between panning system 138 and tilting system 140. In the particular example illustrated, camera support 136 further supports portions of drive mechanisms 150 and 151. Although camera support 136 is illustrated as a generally inverted L-shaped structure, in other embodiments, camera support 136 may have other configurations.

Camera support 137 comprises one or more structures configured to support camera 120 (shown in FIGS. 6 and 7) relative to support 136. In the particular embodiment illustrated, tilt system 140 movably supports support 137 and camera 120 relative to support 136. In the particular example illustrated, support 137 further supports roll system 141.

Panning system 138 comprises an arrangement of one or more structures configured to pivotally support lens 122 about axis 132 while movably supporting camera 120 (shown in FIG. 6) along arc 134 (shown in FIG. 6) to pan camera 120 either leftward or rightward. Panning system 138 includes arcuate guide rail 142 and follower 143. Arcuate guide rail 142 comprises a structure extending in a substantially horizontal plane and configured to engage follower 143 to guide or direct movement of follower 143 along an arc 134. Follower 143 comprises a structure in movable contact or engagement with guide rail 142. In the particular example illustrated, follower 143 moves against and along guide rail 142.

In the particular embodiment illustrated, guide rail 142 extends in an arc having a radius of at least 150 millimeters and less than or equal to about 300 millimeters. The arc defined by guide rail 142 is centered along axis 132 (shown in FIG. 6). In other embodiments, guide rail 142 may have other configurations, may extend along arcs having other radiuses and may be eccentric with respect to axis 132. Although follower 143 is coupled to camera support 136 such that camera support 136 moves with follower 143 along arc 134 defined by guide rail 142, in other embodiments, guide rail 142 may alternatively be coupled to camera support 136 while follower 143 is coupled to base 131 or a stationary structure such as a ceiling or other supporting structure, wherein guide rail 142 and camera support 136 move with respect to follower 143.

Figure 4A:
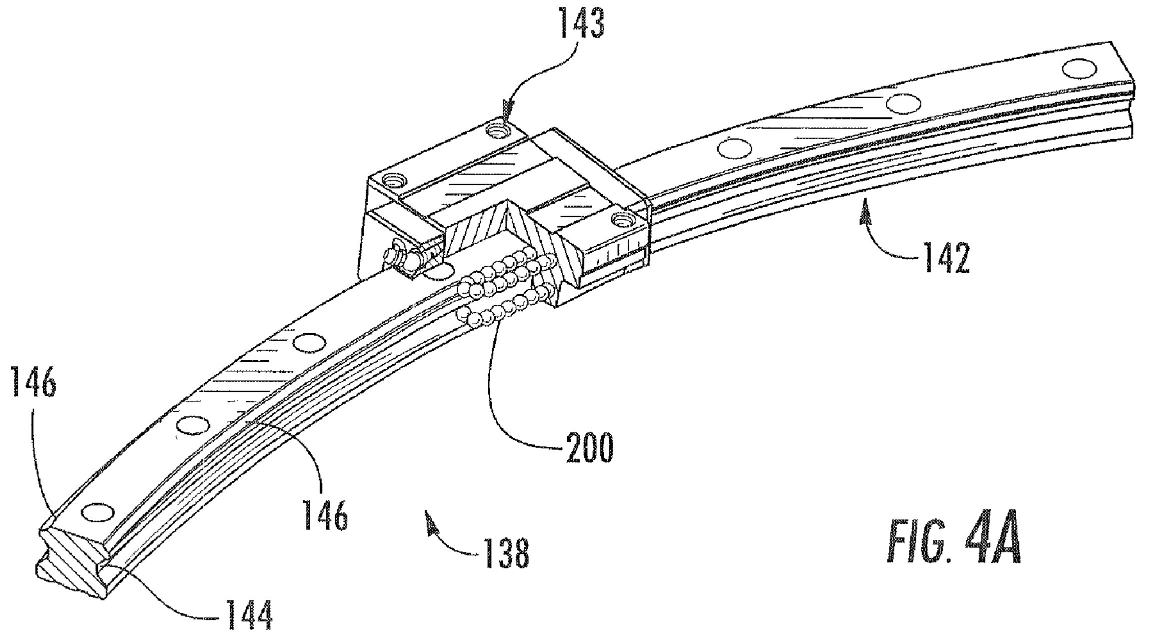
FIG. 4A is a top perspective view of one example of a panning system of the camera observation system of FIG. 3 according to an example embodiment.
Figure 4B:
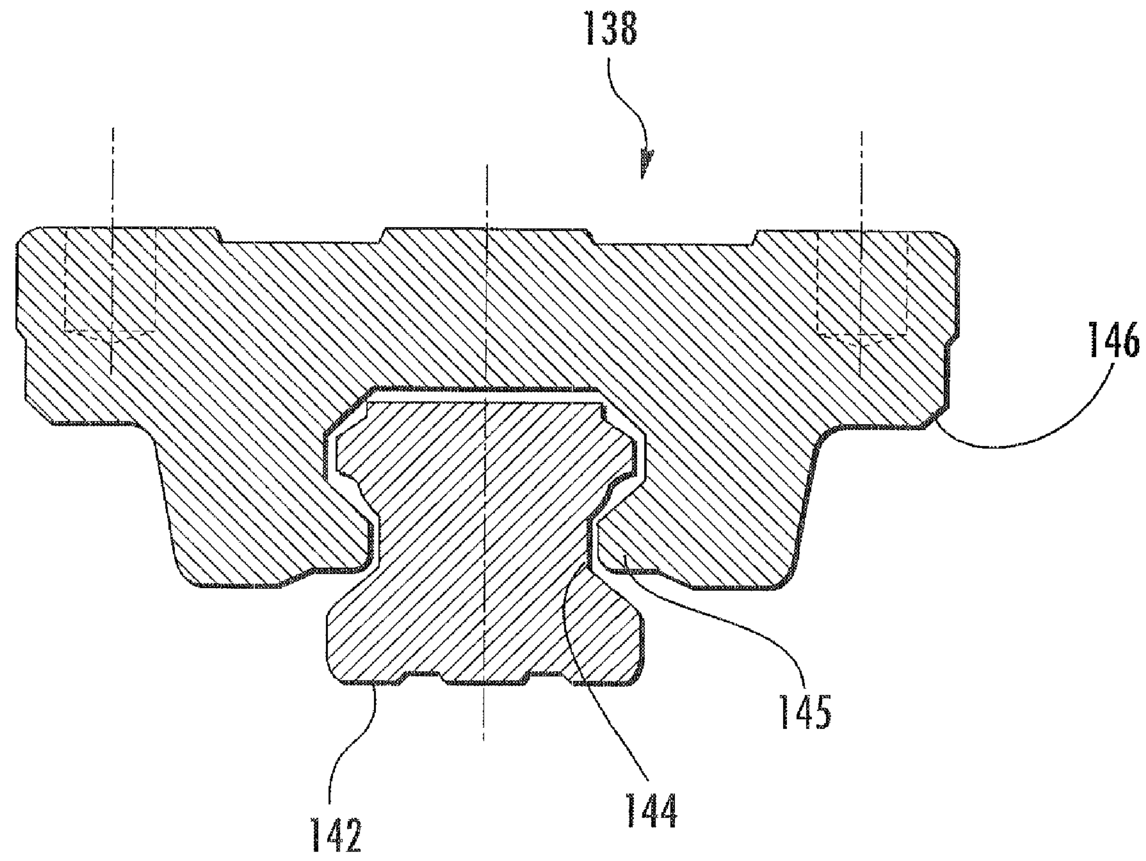
FIG. 4B is a sectional view of the panning system of FIG. 4A according to an example embodiment.

FIGS. 4A and 4B illustrate one example of panning system 138 in more detail. As shown by FIGS. 4A and 4B, guide rail 142 comprises an arcuate slide having an internal channel or groove 144 in which an enlarged end 145 (shown in FIG. 4B) of follower 143 is slidably captured so as to move along guide rail 142 while suspending follower 143 from guide rail 142. In the particular example illustrated, follower 143 comprises a block including ball bearings 200 (shown in FIG. 4A) captured between follower 143 and guide rail 142 to facilitate movement of follower 143 along rail 142. According to one example embodiment, panning system 138 may comprise an HCR 15A+60/300R curved LM guide commercially available from THK America, Inc., in Schaumburg, Illinois. In other embodiments, panning system 138 may alternatively include other components or have other configurations and shapes.

Tilt system 140 (shown in FIG. 3) is similar to panning system 138 except that tilt system 140 pivotally supports lens 122 of camera 120 about axis 133 (shown in FIG. 7) such that camera 120 moves along arc 135 (also shown in FIG. 7). Tilt system 140 includes guide rail 146 and follower 147. Guide rail 146 comprises one or more structures configured to movably support camera 120 along arc 135 with respect to support 136. In the particular example illustrated, guide rail 142 extends along an arc having a radius of at least about 150 millimeters and less than or equal to about 300 millimeters. In the particular example illustrated, guide rail 146 extends along an arc 135 that is centered about axis 133 (shown in FIG. 7).

In other embodiments, guide rail 143 may have other configurations so as to cooperate with follower 143. In other embodiments, guide rail 142 may extend along different arcs having different radiuses and may be eccentric with respect to axis 133 (shown in FIG. 7). In yet other embodiments, follower 143 may extend from camera support 136 while guide rail 146 is connected to camera 120 and moves with respect to follower 143. In the particular example illustrated, tilt system 140 comprises a HCR 15A+36/300R curved LM guide commercially available from THK America, Inc., in Schaumburg, Ill. In other embodiments, tilt system 140 may include other components or may have other configurations.

Figure 5:
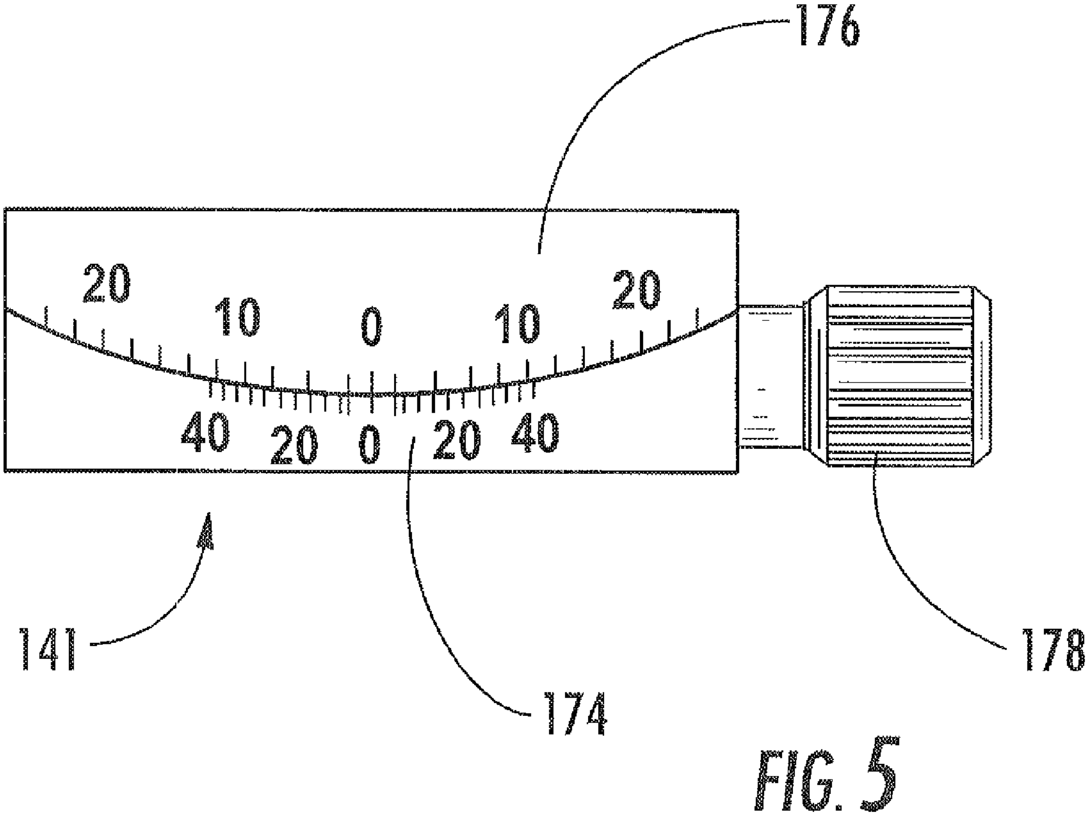
FIG. 5 is a sectional view of one example of a roll system of the camera observation system of FIG. 3 according to an example embodiment.

Roll system 141 movably supports camera 120 such that camera 120 may rotate about axis 149 (shown in FIG. 6). FIG. 5 illustrates one example of roll system 141 in which roll system 141 comprises a goniometer. As shown in FIG. 5, roll system 141 includes an arcuate base 174, slide or rack gear 176 and a lead screw 178. Base 174 is mounted to support 137. Slide 176 is movably connected to base 174 and is in meshing engagement with lead screw 178. Lead screw 178 is rotatably supported by base 174 and in meshing engagement with slide 176 such that rotation of lead screw 178 results in slide 176 rotating about an axis relative to base 174. In the particular example illustrated, slide 176 is coupled to camera 120 (shown in FIG. 6) such that rotation of lead screw 178 also results in rotation of camera 120 about axis 149. In one example embodiment, roll system 141 may comprise an Opto Sigma goniometer 123-2835 commercially available from Opto Sigma Corporation of Santa Ana, Calif. In other embodiments, roll system 141 may alternatively comprise other goniometers or other devices configured to movably support camera 120 about axis 149 (shown in FIG. 6).

Drive mechanism 150 comprises a mechanism configured to move follower 143, camera support 136 and camera 120 along arc 134 (shown in FIG. 6) defined by the interaction of guide rail 142 and follower 143. Drive mechanism 150 generally includes arcuate rack gear 153, drive gear 154, rotary actuator 156 and drive train 158. Arcuate rack gear 153 comprises a rack gear extending along arc 134 substantially opposite to arcuate guide rail 142. In the particular example illustrated, arcuate rack gear 153 extends in a substantially horizontal orientation and is stationarily supported with respect to base 131 or another structure such as a ceiling, sidewall, floor or other structure.

Drive gear 154 comprises a gear in meshing engagement with rack gear 153 such that rotation of gear 154 moves gear 154 along arcuate rack gear 153. Gear 154 is rotatably supported by and coupled to support 136. As a result, movement of gear 154 along rack gear 153 also results in movement of support 136 along rack gear 153 and movement of follower 143 along guide rail 142. In one embodiment, drive gear 154 comprises a worm gear. As a result, gear 154 provides an inherent large gear reduction, reducing the number of other gear reducing components between rotary actuator 156 and gear 154. In other embodiments, gear 154 may alternatively comprise other gears such as a pinion or spur gear.

Rotary actuator 156 comprises an actuator configured to apply and transmit torque to drive gear 154. In the particular embodiment illustrated, rotary actuator 156 comprises a stepper motor. According to one example embodiment, rotary actuator 146 comprises an IMS MDIFH 2218-4E motor commercially available from Intelligent Motion Systems, Inc., of Marlborough, Conn. In other embodiments, rotary actuator 156 may comprise other devices configured to supply torque such as DC motors, servomotors and the like.

Drive train 158 transmits torque from rotary actuator 156 to gear 154. In the particular example illustrated, drive train 158 includes a pair of intermeshing spur gears 160, 161 which transmit torque from rotary actuator 156 to drive gear 154. In other embodiments, rotary actuator 156 may be operably coupled to drive gear 154 by other gear trains, by chain and sprocket arrangements or by belt and pulley arrangements. In still other embodiments, rotary actuator 156 may be directly coupled to drive gear 154, omitting drive train 158.

Drive mechanism 151 comprises a mechanism configured to move camera 120 and support 137 along arc 135 (shown in FIG. 7) defined by interaction between follower 147 and arcuate guide rail 146. In the particular example illustrated, drive mechanism 151 generally includes arcuate rack gear 162, drive gear 164, rotary actuator 166 and drive train 168. Arcuate rack gear 162 comprises a rack gear extending along arc 135 (as shown in FIG. 7) substantially opposite to arcuate guide rail 146. In the particular example illustrated, arcuate rack gear 162 extends in a substantially vertical orientation and is stationarily supported with respect to support 136.

Drive gear 164 comprises a gear in meshing engagement with rack gear 162 such that rotation of gear 164 moves gear 164 along arcuate rack gear 162. Gear 164 is rotatably supported by and coupled to camera support 137. As a result, movement of gear 164 along rack gear 162 also results in movement of support 137 along rack gear 162 and movement of follower 147 along guide rail 146. In one embodiment, drive gear 164 comprises a worm gear. As a result, gear 164 provides an inherent large gear reduction, reducing the number of other gear reducing components between rotary actuator 166 and gear 164. In other embodiments, gear 164 may alternatively comprise other gears such as a pinion or spur gear.

Rotary actuator 166 comprises an actuator configured to apply and transmit torque to drive gear 164. In the particular embodiment illustrated, rotary actuator 166 comprises a stepper motor. According to one embodiment, rotary actuator 156 may comprise an IMS MDIFH 2222-4E motor commercially available from Intelligent Motion Systems, Inc., of Marlborough, Conn. In other embodiments, rotary actuator 166 may comprise other devices configured to supply torque such as DC motors, servo motors and the like.

Drive train 168 transmits torque from rotary actuator 166 to gear 164. In the particular example illustrated, drive train 168 includes a pair of intermeshing bevel gears 170, 171 which transmit torque from rotary actuator 166 to drive gear 164. In other embodiments, rotary actuator 166 may be operably coupled to drive gear 164 by other gear trains, by chain and sprocket arrangements or by belt and pulley arrangements. In still other embodiments, rotary actuator 166 may be directly coupled to drive gear 164, omitting drive train 168.

Drive mechanism 152 comprises a mechanism configured to supply torque or other force to roll system 141 so as to rotate camera 120 about axis 149 (shown in FIG. 6). In the particular example illustrated, drive mechanism 152 is configured to supply torque so as to rotate lead screw 178 of roll system 141. According to one embodiment, drive mechanism 152 generally includes a rotary actuator 180 operably coupled to lead screw 178 by a belt 182 connected to an output shaft of rotary actuator 180. In the particular example illustrated, rotary actuator 180 comprises a stepper motor. According to one embodiment, rotary actuator 180 comprises an IMS MDIFH 1713-4E motor commercially available from Intelligent Motion Systems, Inc., of Marlborough, Conn. In other embodiments, rotary actuator 180 may comprise other devices configured to supply torque such as DC motors, servo motors and the like, and may be operably coupled to lead screw 178 in other fashions such as by a gear train, a chain and sprocket arrangement and the like. In still other embodiments, rotary actuator 180 may be directly connected to lead screw 178, omitting belt 182.

Controller 190 comprises one or more processing units configured to generate control signals for directing operation of rotary actuators 156, 166 and 180. FIGS. 6 and 7 schematically illustrate the positioning of camera 120 at various positions by rotary actuators 156 and 166 in response to control signals generated by and received from controller 190. As shown by FIG. 6, in response to receiving control signals from controller 190, rotary actuator 156 (shown in FIG. 3) may supply torque to drive gear 154 in a first direction such that drive gear 154 moves along arcuate rack gear 153 to move follower 143 along arcuate guide rail 142 so as to move support 136 and associated camera 120 from a generally centered position 192 (shown in phantom) to a first angled position 194 (shown in solid lines). As further shown by FIG. 6, in response to control signals received from controller 190, rotary actuator 156 supplies torque in a second opposite direction so as to rotate drive gear 154 in a second opposite direction. As a result, drive gear 154 also moves in an opposite direction along rack gear 153 so as to move follower 143 along arcuate guide rail 142. Consequently, support 136 and associated camera 120 move in a second opposite direction along arc 134 to a second angular position 196 (shown in phantom). In the particular example shown, movement of camera 122 to position 194 aims lens 122 in a rightward direction as seen in FIG. 6. Movement of camera 120 to position 196 along arc 134 aims lens 122 in a leftward direction as seen in FIG. 6. In the particular example illustrated, arcuate guide rail 142 and arcuate rack gear 153 are configured such that camera 120 may be moved or panned across a pan angle of at least about 60 degrees and nominally about 60 degrees. In other embodiments, pan system 138 may be configured to provide greater or smaller range of pan positions.

As shown by FIG. 7, in response to receiving control signals from controller 190 (shown in FIG. 3), rotary actuator 166 (shown in FIG. 3) may supply torque to drive gear 164 in a first direction such that drive gear 164 moves along arcuate rack gear 162 to move follower 153 along arcuate guide rail 152 so as to move support 137 and associated camera 120 from a generally horizontally oriented position 202 (shown in solid lines) to a first downwardly tilted position 204 (shown in phantom). As further shown by FIG. 7, in response to control signals received from controller 190, rotary actuator 166 supplies torque in a second opposite direction so as to rotate drive gear 164 in a second opposite direction. As a result, drive gear 164 also moves in an opposite direction along rack gear 162 so as to move follower 147 along guide rail 146. Consequently, support 137 and associated camera 120 move in a second opposite direction along arc 135 to a second upwardly tilted position 206 (shown in phantom).

In the particular example illustrated, arcuate rack gear 162 and arcuate guide rail 146 are configured such that camera 120 may be moved or tilted across a tilt range of at least about 30 degrees and nominally about 30 degrees. In the particular example illustrated, guide rail 146 and arcuate rack gear 152 are configured so as to move camera 120 equal angular degrees above and below the horizontal. In other embodiments, arcuate guide rail 146 and arcuate rack gear 162 may alternatively be configured such that camera 120 may pivot or tilt a greater distance or angular extent above the horizontal as compared to the angular distance below the horizontal or vice versa.

Overall, like camera observation system 10 shown in FIGS. 1 and 2, camera observation system 110 shown in FIGS. 3-7 facilitates viewing or monitoring of an area on a side of a structure 14 using equipment or components located substantially on a second opposite side of structure 14. Such viewing occurs through opening 18 within structure 14. Because camera 120 is pivoted about one or more axes, such as axes 132 and 133, which are proximate to opening 18 of structure 14, camera observation system 110 provides an increased viewing range without substantially increasing the size of opening 18. In one particular embodiment, the inner edges of opening 18 are spaced from the outer edges of lens 122 by opposite gaps wherein each gap is a width less than or equal to about 16% of the overall diameter of lens 122 for a lens 122 configured to rotate at least +-30 degree through opening 18.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:

a mount configured to pivotally support a lens of a camera about a first axis proximate a structural opening; and a first drive mechanism offset from the first axis and configured to pivot the lens about the first axis, wherein the first axis is spaced from either side of the structural opening by less than or equal to about 0.64 cm.

2. The apparatus of claim 1, wherein the first axis is substantially horizontal.

3. The apparatus of claim 1, wherein the first axis is substantially vertical.

4. The apparatus of claim 3, wherein the mount is configured to support the lens of the camera about a second substantially horizontal axis proximate the structural opening.

5. The apparatus of claim 1, wherein the mount is configured to pivotally support the camera about the first axis along an arc having a radius of at least about 150 millimeters.

6. The apparatus of claim 1, wherein the mount is configured to pivotally support the camera about the first axis along an are having a radius of less than or equal to about 300 millimeters.

7. The apparatus of claim 1 wherein the mount is configured to support the first drive mechanism such that the drive mechanism is on a first side of the structural opening and is substantially hidden from a second side of the structural opening.

8. The apparatus of claim 1, wherein the mount comprises:

a first arcuate guide; and a first follower adjacent the guide, wherein one of the guide and the follower is configured to be coupled to the lens and is movable with respect to the other of the follower and the guide.

9. The apparatus of claim 8, wherein the mount further comprises:

a second arcuate guide; and a second follower, wherein one of the second arcuate guide and the second follower is coupled to the lens and is adjacent the other of the second arcuate guide and the second follower to pivot the lens about a second axis.

10. The apparatus of claim 9, wherein the first drive mechanism is configured to move said one of the first guide and the first follower with respect to the other of the first guide and the first follower and wherein the apparatus further comprises:

a second drive mechanism configured to move said one of the second guide and the second follower with respect to the other of the second guide and the second follower.

11. The apparatus of claim 10, wherein the first drive mechanism is configured to move the first guide along the first follower with respect to the first follower and wherein the second drive mechanism is configured to move the second guide along the second follower with respect to the second follower.

12. The apparatus of claim 8, wherein the first drive mechanism is configured to move said one of the first guide and the first follower with respect to the other of the first guide and the first follower.

13. The apparatus of claim 12, wherein the first drive mechanism comprises:

a first arcuate rack gear;

a first gear, wherein one of the first rack gear and the first gear is coupled to the camera lens; and a first motor connected to the other of the rack gear and the first gear, wherein rotation of the first gear by the motor moves said one of the rack gear and the first gear along an arc.

14. The apparatus of claim 1, wherein the mount is configured to rotate the lens about a second axis substantially perpendicular to a plane along which the lens substantially extends.

15. The apparatus of claim 1 further comprising a structure having the opening.

16. The apparatus of claim 1 further comprising a camera supported by the mount and having a lens.

17. The apparatus of claim 1, wherein each perimeter edge of the lens is spaced from an opposite edge of the opening by a distance less than or equal to about 16% of a diameter of the lens, wherein the lens pivots through a range of at least 60 degrees.

18. The apparatus of claim 1, wherein the structural opening has opposite sides spaced by a thickness and wherein the first axis extends within the thickness so as to not intersect either of the opposite sides.

19. The apparatus of claim 1, wherein mount is configured such that the first axis is proximate an outer end of a tube of the camera containing the lens.

20. The apparatus of claim 1, wherein the mount is configured such that a camera tube containing the lens does not project beyond the structural opening.

21. The apparatus of claim 1, wherein the mount is configured to pivotally support the lens of the camera about a second axis perpendicular to the first axis proximate an outer end of a lens containing tube of the camera.

22. The apparatus of claim 1, wherein the structural opening has a thickness, wherein the first axis extends within the thickness and wherein the lens is within the thickness.

23. An apparatus comprising:

a mount configured to pivotally support a lens of a camera about a first axis proximate a structural opening; and a first drive mechanism offset from the first axis and configured to pivot the lens about the first axis, wherein each perimeter edge of the lens is spaced from an opposite edge of the opening by a distance less than or equal to about 16% of a diameter of the lens, wherein the lens pivots through a range of at least 60degrees.

* * * * *

UNITED STATES PATENT AND TRADEMARK OFFICE
CERTIFICATE OF CORRECTION

PATENT NO. : 7,520,684 B2
APPLICATION NO. : 11/352861
DATED : April 21, 2009
INVENTOR(S) : David R. Ingalls et al.

It is certified that error appears in the above-identified patent and that said Letters Patent is hereby corrected as shown below:

In column 9, line 64, in Claim 6, delete “are” and insert -- arc --, therefor.

In column 10, line 40, in Claim 13, after “of” insert -- the other of the rack gear and --.

Signed and Sealed this

Thirteenth Day of July, 2010

David J. Kappos
*Director of the United States Patent and Trademark Office*